United States Patent [19]
Robinson et al.

[11] Patent Number: 4,915,631
[45] Date of Patent: Apr. 10, 1990

[54] FISHING WORM THREADER

[76] Inventors: Oscar T. Robinson; Ann Robinson, both of 348 22nd St., Costa Mesa, Calif. 92627

[21] Appl. No.: 362,204

[22] Filed: Jun. 6, 1989

Related U.S. Application Data

[63] Continuation of Ser. No. 204,885, Jun. 10, 1988.

[51] Int. Cl.$^4$ .............................................. A01K 97/00
[52] U.S. Cl. ......................................................... 43/4
[58] Field of Search ............................................... 43/4

[56] References Cited

U.S. PATENT DOCUMENTS

| | | | |
|---|---|---|---|
| 2,948,979 | 8/1960 | Kulp | 43/4 |
| 4,073,083 | 2/1978 | Davis | 43/4 |
| 4,118,881 | 10/1978 | McFarlane | 43/4 |
| 4,706,403 | 11/1987 | Reynolds | 43/4 |

Primary Examiner—Richard K. Seidel
Assistant Examiner—James Miner
Attorney, Agent, or Firm—Morland C. Fischer

[57] ABSTRACT

A fishing worm threader for facilitating the placement of a live worm, or the like, on a fishing hook. The threader comprises a hollow threading tube, one end of which being embedded within a handle. The opposite end of the tube is angled (e.g. at 60 degrees) to form a hollow socket within which to receive the barb of a conventional fishing hook. In operation, the worm is first theaded onto the tube. The barb is then located within the socket so that the worm can be displaced (i.e. slid) from the threading tube onto the hook. A fishing line support extends outwardly from the handle to receive and maintain the fishing line in a taut condition during the worm threading operation.

4 Claims, 1 Drawing Sheet

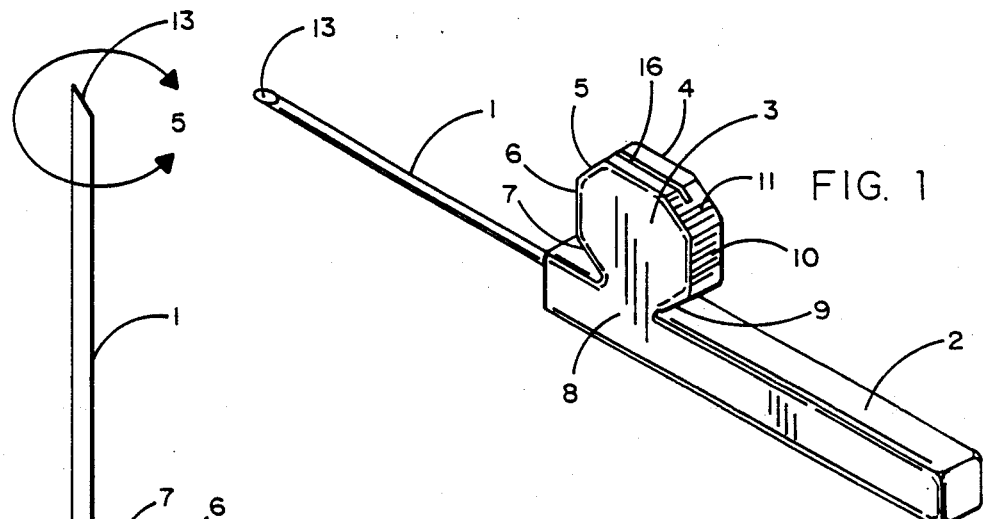
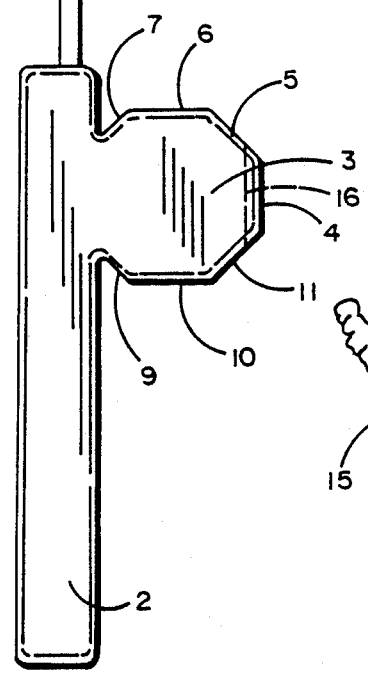
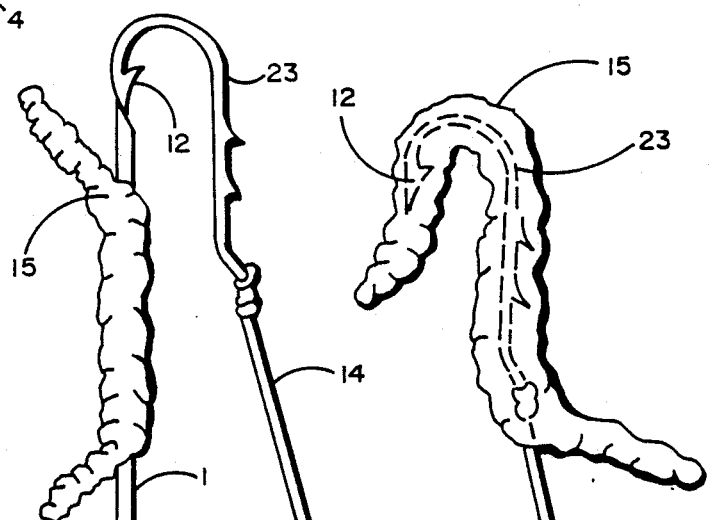
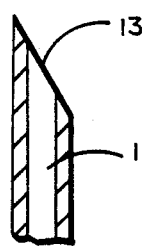
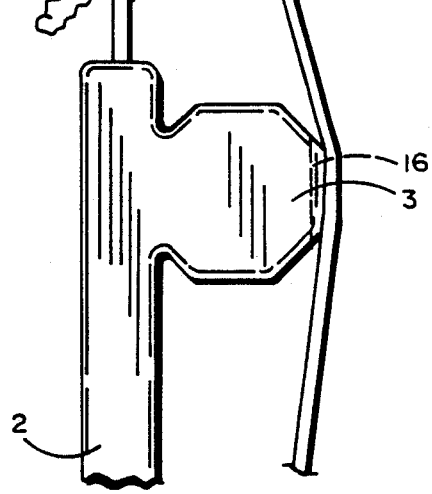

4,915,631

FISHING WORM THREADER

CROSS-REFERENCES TO RELATED APPLICATIONS

This application is a continuation of application Ser. No. 204,885 filed June 10, 1988 now abandoned.

BACKGROUND OF THE INVENTION

1. Field of the Invention

This invention relates to a fishing worm threader by which a fisherman can easily and safely place a worm or similar bait on a fishing hook.

2. Background Art

The proper threading of a fishing hook with a worm or similar bait is essential to fishing. As experienced fisherman know, if the fishing hook is not completely covered with the worm, fish generally detect the hook and are distracted from biting on the bait.

The task of insuring that the worm completely covers the fishing hook is tedious and can sometimes result in injury to the fisherman by the hook piercing the skin of the fisherman's hand.

Various devices have been developed to assist in the threading operation. Reference may be made to the following U.S. patents for examples of such previously developed devices:

U.S. Pat. No. 2,423,899,
U.S. Pat. No. 4,118,881,
U.S. Pat. No. 4,559,734, and
U.S. Pat. No. 4,073,083.

SUMMARY OF THE INVENTION

In general terms, a fishing worm threader is disclosed by which a fisherman can easily and safely place a worm or similar bait onto a conventional fishing hook. The threader comprises a hollow (e.g. metallic) threading tube, one end of which being embedded within a (e.g. plastic) handle. The outer tip of the opposite end of the threading tube is cut (e.g. at 60 degrees) to form an angled socket. A worm is first placed onto the threading tube. The barb of the fishing hook is then received within the hollow socket of the threading tube, whereby to reliably retain the hook in communication with the tube. Accordingly, the worm may be easily displaced (i.e. slid) from the threading tube onto the fishing hook. The hook is then removed from the socket of the threading tube with the worm suitably carried by the hook. In a preferred embodiment, a fishing line support extends outwardly from the handle to receive and maintain the fishing line in a taut condition during the threading operation.

BRIEF DESCRIPTION OF THE DRAWINGS

FIG. 1 shows a perspective view of the fishing worm threader which forms the present invention;

FIG. 2 shows a side view of the threader of FIG. 1;

FIG. 3 shows a side view of the threader during the baiting operation;

FIG. 4 shows a worm after transfer from the threader to the fishing hook; and

FIG. 5 is a detailed, fragmented cross-section of a hollow socket within which the fishing hook is received during the threading operation.

DESCRIPTOIN OF THE PREFERRED EMBODIMENT

The fishing worm threader which forms the present invention is best described while referring to the drawings, where FIG. 1 shows an elongated threading tube 1, one end of which being embedded within a handle 2. The handle 2 can be molded from any suitable material (e.g. plastic) which is easy and inexpensive to manufacture. The opposite end of threading tube 1 is hollow. Alternatively threading tube 1 may be entirely hollow. The outer tip 13 of threading tube 1 is cut at an angle to form a hollow socket within which to receive and retain the barb of a conventional fishing hook (best shown in FIG. 3).

In accordance with a preferred embodiment of the invention, and referring concurrently to FIGS. 1 and 2 of the drawings, an octagonally shaped and outwardly projecting fishing line support 3 may be formed integrally with handle 2. The fishing line support 3 has sides 4, 5, 6, 7, 9, 10 and 11. An otherwise side portion 8 is integral with the handle 2. The outer-most side 4 of fishing line support 3 is preferably includes a slit 16 so that a fishing line 14 (best shown in FIGS. 3 and 4) can be received therein and maintained taut thereagainst during the threading operation.

FIGS. 2 and 5 show side views of the outer tip 13 of threading tube 1. The outer tip 13 is cut at an angle to accommodate the barb 12 of a fishing hook 23. Such an angle lies in a range of angles from 45 degrees to 75 degrees from the vertical, and is preferably 60 degrees from an imaginary vertical line extending from the tube 1.

The threading tube 1 is preferably made of brass. However, other suitable materials can be utilized, including copper, steel, plastic, and the like. The length of tube 1 is generally about 4 inches, approximately 1 inch of which being embedded within the handle 2. Therefore, the exposed portion of the tube is about 3 inches. As indicated, the handle 2 is preferably molded plastic. The handle 2 can be of any suitable dimensions. However, handle 2 is typically about 4 inches long and ½ inch wide.

In operation, a worm 15 is placed onto threading tube 1 with the opposite ends of the worm extending away therefrom as shown in FIG. 3. That is, the fisherman simply pierces the worm 15 with the angled tip 13 of threading tube 1 at a distance behind one end of the worm, and then pushes the tube through the entire worm. The reason that the worm is pierced behind one end is because fishing hooks generally do not accommodate the entire worm, and it is preferable that some portion of the worm not be on the hook so that such portion can wiggle during the fishing operation. At any rate, the threading tube 1 is pushed through the worm so as to extend outwardly therefrom, as shown in FIG. 3. The barb 12 of the fishing hook 23 is then placed in the socket within the hollow outer tip 13 of tube 1. Hooks in prior art worm threading devices were prone to slip and, accordingly, would sometimes cut the fisherman's fingers. However, outer tip 13 of tube 1 of the worm threader of the present invention is advantageously angled, as previously described, to efficiently and safely accommodate the hook 23 and thereby prevent the hook from sliding off the threading tube 1. After the hook 23 is secured within the socket at the outer tip 13, of the hollow threading tube 1, the worm 15 is moved along the tube and onto the hook. The threading tube 1 is then separated from the hook 23 with the worm embedded on the hook, as shown in FIG. 4.

During the aforementioned worm threading operation, the fishing line 14 is placed within the slit 16 in the outer-most end 4 of the octagonal fishing line support 3, whereby the fisherman can maintain said line in a taut condition and thereby minimize the chance that the barb 12 of hook 23 might be inadvertently separated from the socket at the hollow tip 13 of tube 1.

It will be apparent that while a preferred embodiment of the invention has been shown and described, various modifications and changes may be made without departing from the true spirit and scope of the invention. For example, the octagonal shape of fishing line support 3 is preferred, but it is to be understood that any other suitable shape may be utilized to accommodate the fishing line 14 during the baiting operation.

What is claimed is:

1. A fishing worm threader by which to place a worm or similar bait on a fishing hook that is attached to a fishing line, said threader comprising an elongated handle means, an elongated threading tube being in parallel alignment with said handle means wherein said threading tube is to be pushed through the body of a worm, one end of said threading tube being received by one end of said handle means and the second end of said threading tube being hollow to form a socket in which to receive and retain the barb of the fishing hook so that the worm can be slid off said threading tube and onto the hook, and a fishing line support projecting outwardly perpendicularly from said handle means, the outermost surface of said fishing line support having a slit extending therethrough within which to receive the fishing line so that the user can grip the handle and place his thumb across said slit in the outermost surface of said fishing line support to maintain said fishing line in a taut condition during the time that the worm is slid from said threading tube to said hook.

2. The fishing worm threader recited in claim 1, wherein the entire length of said threading tube is hollow.

3. The fishing worm threader recited in claim 1, wherein the second end of said threading tube is cut at an angle to form the socket for retaining the barb of the fishing hook.

4. The fishing worm threader recited in claim 3, wherein said angle is 60 degrees relative to a vertical reference line.

* * * * *